Patented May 30, 1950

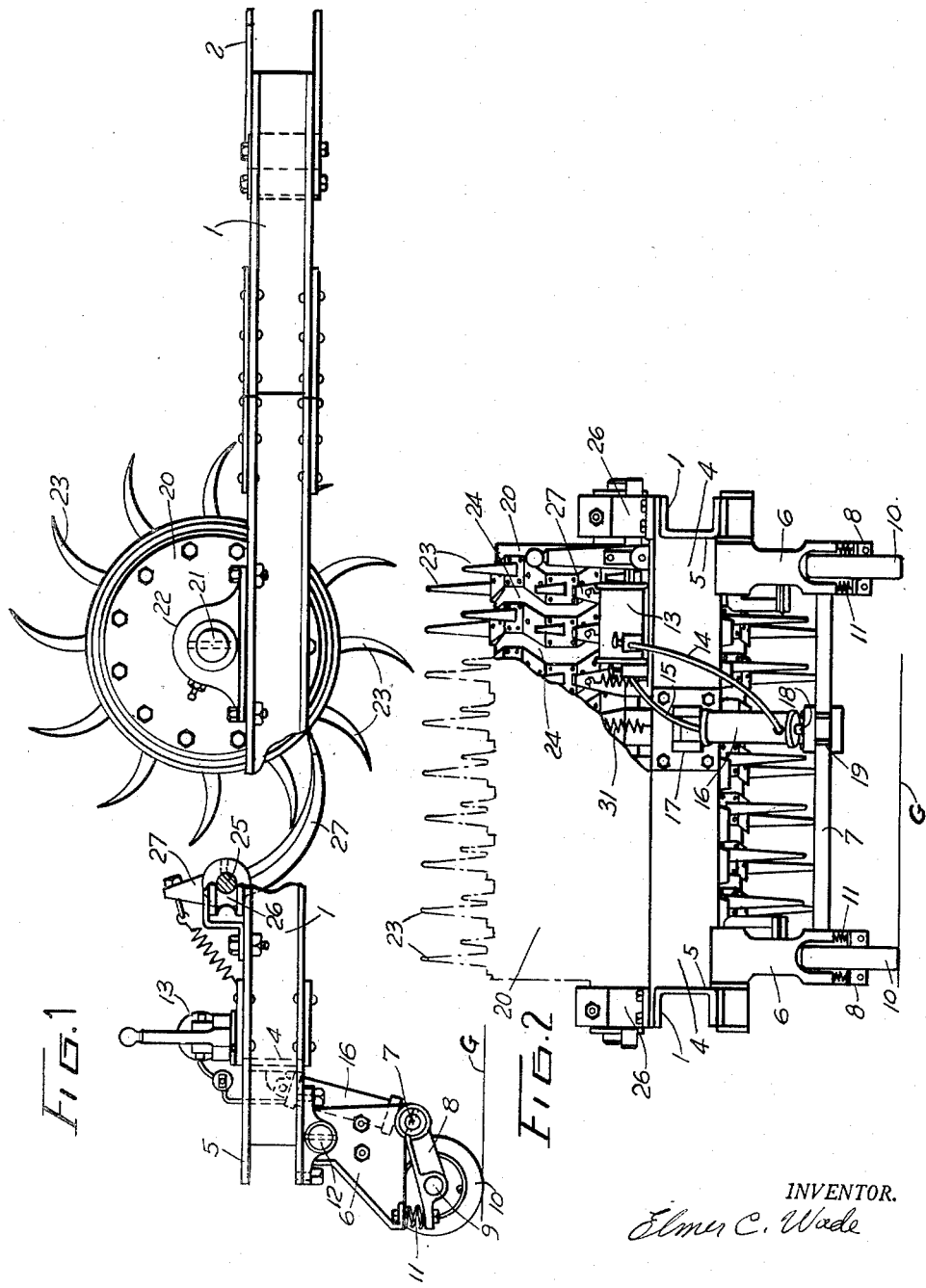

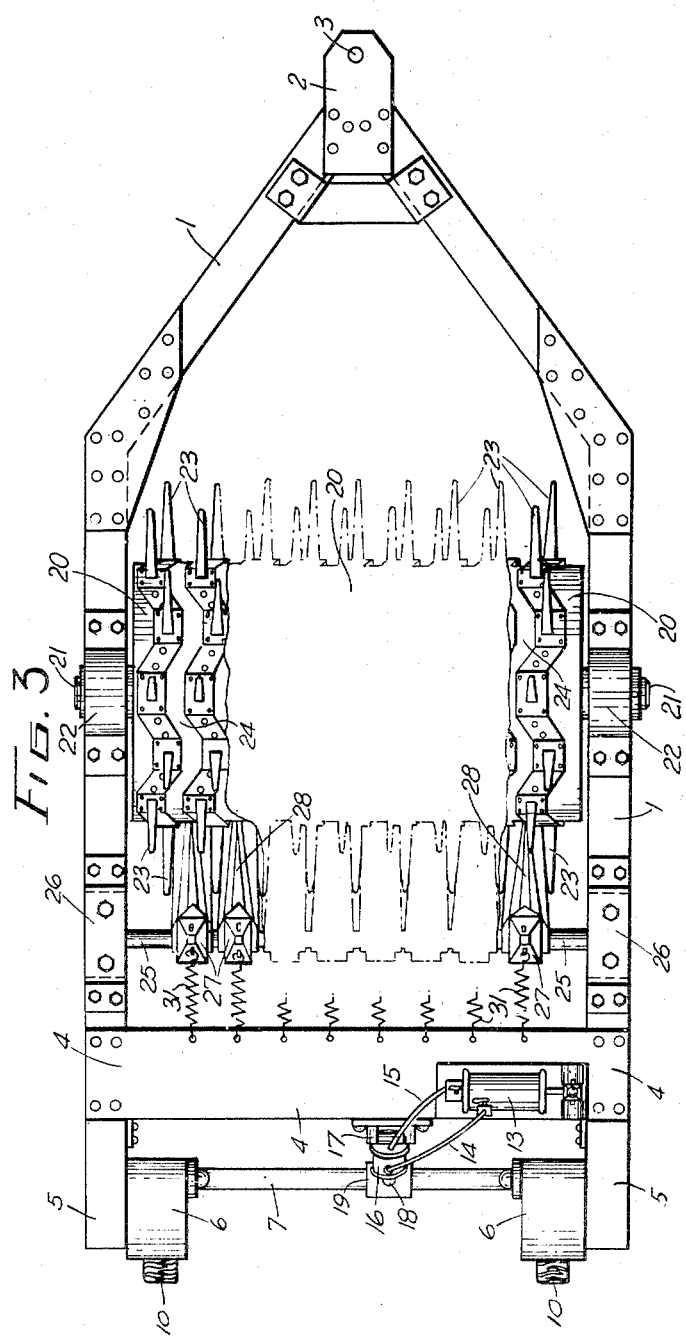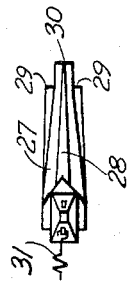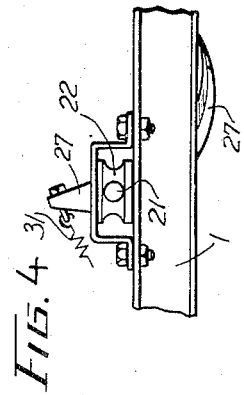

2,509,463

UNITED STATES PATENT OFFICE 2,509,463

CURVED TOOTH ROLLER TYPE LAND CLEARING MACHINE COMBINED WITH TOOTH CLEANER

Elmer C. Wade, New York, N. Y.

Application May 28, 1947, Serial No. 750,911

1 Claim. (Cl. 97—52)

The invention relates to land clearing apparatus, and, particularly, to that class of such apparatus arranged to remove from beneath the topsoil of cut-over land small stumps and roots of trees, bushes, and other plants, and also small detached stones.

The present invention covers apparatus suited to be employed in a land-clearing operation after the land has been surface-cleared or cut over by an apparatus such as that described and claimed in my co-pending application, in the United States Patent Office, bearing Serial Number 750,912, filed the 28th day of May, 1947.

The object, in part, is to provide a new, simple, rugged, and practical apparatus which may be economically employed as, say, the trailer for a tractor, for the purpose of plowing up small stumps and roots of trees, bushes, and other plants from the topsoil of cut-over land, for tearing or otherwise dislodging such stumps and roots from beneath the topsoil, and for depositing them freely on the surface of the land so that they may be conveniently raked or otherwise gathered together into piles or forms similar to windrows for burning or other disposition.

The apparatus is also useful for the purpose of dislodging from beneath the topsoil small objects of various kinds, such as loose stones, sticks, and other debris.

My invention contemplates an apparatus that, as a trailer element for a tractor, or the like, will automatically probe for, engage, and dislodge small stumps and roots and other debris, without requiring selective attention on the part of an operator other than that associated with guiding the apparatus over land in a track pattern appropriate to the topography of the area to be worked. Manual excavating, cutting, and dislodging small stumps and roots is obviated by use of the apparatus of my invention, thereby enabling, in many cases, a tractor driver to handle this type of land-clearing operation without a helper.

In the drawings:

Figs. 1, 2, and 3 are, respectively, partly erased side elevational, rear elevational, and top plan views of a typical embodiment of my invention, showing an apparatus arranged to be towed by a tractor.

Fig. 4 is a partly erased side elevational view of that part of the apparatus near and including the part erased in Fig. 1.

Fig. 5 is a top plan view of a typical member 27 seen fully, without interference from adjacent members as in Fig. 1.

I have adopted as one practical reduction of my invention a form of apparatus comprising, in essence, a trailer frame arranged to be towed by a tractor; land-clearing means carried on and within said frame, and more particularly described below; a retractable dolly pivotally mounted at the rear end of said frame, and arranged to serve, when positioned as shown in Figs. 1, 2, and 3, as a support for the rear end of the frame high enough to prevent the land-clearing means from engaging the ground when the apparatus is being wheeled to and from a site of a land-clearing operation; and hydraulic means for selectively positioning said dolly, arranged so that the rear of the frame may be raised relatively with respect to the surface of the ground to an extent sufficient fully to disengage from the topsoil the land-clearing means carried in a fixed position with respect to the frame, or so that the rear of the frame may be lowered to that extent that the full weight of the frame and its members, not depending, say, upon the tractor coupling for support, may be applied upon that part of the land-clearing means in contact with the earth, and that no part of the weight will be borne by the dolly, which may, in fact, be actually out of contact with the topsoil.

The typical apparatus shown in the drawings is, of course, a trailer without integral means of locomotion; but it will be understood that the invention may be embodied in other forms of apparatus having integral means of locomotion. For example, the invention could be reduced practically as a fixed part of a tractor.

It is, of course, desirable that, whatever form of apparatus be adopted for reducing the invention to practice, means be provided to render it possible to transport the apparatus to and from a site of a land-clearing operation with the land-clearing means in an inoperative position with respect to a road or other surface over which the apparatus is moved in order to avoid scarifying such surface. While means other than the dolly, here shown, are feasible, none are illustrated as they are obvious. It will be understood that the dolly—if a wheeled means for supporting the rear end of the frame be adopted in a reduction of the invention to practice—need not be permanently attached to the apparatus, as shown on the drawings; for a detachable, rather than a retractable, dolly would serve equivalently. Also it will be apparent that the entire apparatus, if not provided with means for wheeling it to and from a work site, could be transported inoperatively on the deck of a truck or truck trailer.

With reference now to the drawings, I have adopted as illustrative of the invention a form of apparatus arranged to be towed by a tractor, shown to be basically a frame 1, pentagonal in shape, and with its operative means carried within and on the frame after the manner of many agricultural implements, such as cultivators and planters. The frame 1 may suitably be constructed of channel stock, either welded or bolted together to form a rigid chassis.

The front end of the frame 1 is provided with a tongue 2, perforated at 3 to receive a king pin or other convenient member for pivotally attaching the frame to a towing tractor or the like.

To the rear of a cross member 4 of the frame, and pivotally attached to and beneath rearward extensions 5, 5, of the frame (cf. Figs. 1, 2 and 3), I provide the retractable dolly abovementioned.

The dolly consists in a rigid U-shaped frame comprising two members 6, one on either side of the rear of the frame 1 and beneath an extension 5, and a connecting cross bar, or shaft, 7; and two wheel-mounts 8, each carrying a stub-shaft 9 and wheel 10, and each provided with a shock-absorber 11 fitted between the wheel-mount 8 and the dolly frame member 6.

Each member 6 is pivotally attached at 12 to the under side of its related frame extension 5, so that the members 6, 6, together with the cross bar, or shaft, 7, and the parts carried by the the dolly frame, may be rotated (clockwise, as seen in Fig. 1) for the purpose of raising and lowering the rear end of the frame 1.

The wheel-mounts 8, 8, are pivotally attached to the cross bar, or shaft 7, as indicated in Figs. 1 and 2.

I have indicated a ground surface line as G in Figs. 1 and 2. When the dolly is positioned as shown in these two figures it will be seen that no other parts of the apparatus are in contact with the surface of the topsoil or of a road, for example, so that the apparatus may be wheeled inoperatively when desired.

On the cross member 4 I provide a manually operable hydraulic pump 13 connected by tubes 14 and 15 to a cylinder 16, pivotally mounted to a bracket 17 fixed to the rear vertical surface of the cross member 4. The cylinder 16 is suitably provided with a piston, the rod 18 of which is pivotally connected to the cross bar, or shaft, 7, at 19. When liquid is pumped through one tube into cylinder 16 by means of the pump 13 the dolly is lowered; through the other tube, raised.

Within the frame 1, and arranged transversely thereto at, arbitrarily, about the fore-and-aft center thereof, I provide a drum 20, carried on a shaft 21 which is supported on either side of the frame 1 by boxes 22, 22. The cylindrical surface of the drum 20 is provided with a number of curved radially disposed spikes 23, arranged in cylindrical series of rows, each row being parallel to the axis of shaft 21, and the spikes of each alternate row being staggered with respect to those of the adjacent rows, as shown.

A series of parallel, sinuous, and circuitous slots 24 are provided around the cylindrical surface of the drum, each such slot weaving from side to side, threading between two spikes of each row, as it is continued around the drum.

Pivotally carried on shaft 25, the ends of which are supported in boxes 26, 26, on the frame 1 to the rear of boxes 22, 22, and of the drum 20, are a series of member 27, there being one such member 27 provided for each slot 24. The members 27, one of which is shown in top plan view in Fig. 5, serve as strippers; each member 27 is a tapering, spoon-shaped element, having a reinforcing ridge 28 on the forwardly disposed, or concave side, with the forwardly disposed extremity being shouldered at 29, 29, to provide a finger, or tracing element, 30, arranged to engage and ride in a related slot 24. Each member 27 is held in tensioned engagement with its related slot 24 by means of a spring 31, as shown, attached to the top of the member 27 above the shaft 25 and to the cross member 4 of the frame 1. Each member 27 is free to move axially on shaft 25.

When the apparatus is over ground where a land-clearing operation is to be performed, the dolly is suitably retracted until the frame is sufficiently lowered to cause the downwardly disposed spikes 23 of the drum 20 to touch and enter the topsoil. To insure proper penetration of the earth the entire available weight of the apparatus, not dependent for support upon the coupling connecting the front end of the apparatus to, say, a tractor, is preferably permitted to bear upon the ends of the downwardly disposed spikes. For this reason the dolly may be retracted until the rear of the frame 1 is entirely dependent for support upon the drum 20 and its spikes 23, and the dolly itself actually out of contact with the ground.

Also, the drum 20 may be constructed of heavy material and suitably weighted: for example, the drum may be made watertight, and means may be provided whereby the drum may be temporarily loaded with water to add considerable weight to the load upon the spikes 23 and thereby insure proper penetration of the topsoil.

As the apparatus is towed over the land the drum 20 is revolved by the rack-and-pinion engagement between the earth and the drum; the rows of spikes are successively brought into contact with the topsoil, are forced into it, and into or near roots and the like; and as the spikes are successively withdrawn from the earth, carrying roots and other objects, and proceed past the members 27, objects caught on or between and entangled among the spikes are stripped off and dropped to the surface of the ground behind the apparatus. Obviously, as the drum 20 rotates, the slots 24 cause the members 27 to oscillate from side to side in a chopping motion which is desirable in breaking off or loosening objects attached to the spikes or drum.

I claim:

A land clearing machine, comprising a frame, a shaft having end bearings on the frame, a cylindrical drum mounted to turn on the shaft, a series of curved ground engaging spikes disposed radially on the drum, the drum being formed with sinuous slots located between the inner ends of the spikes, a cross bar on said frame, a series of spring pressed strippers pivotally supported on the cross bar and tracers on the forward ends of said strippers riding in said slots, whereby said strippers will be caused to move laterally to disengage debris carried by the drum and spikes.

ELMER C. WADE.

REFERENCES CITED

The following references are of record in the file of this patent:

UNITED STATES PATENTS

| Number | Name | Date |
|---|---|---|
| 569,630 | Frost | Oct. 20, 1896 |
| 855,075 | Thomas | May 28, 1907 |
| 911,417 | Maley | Feb. 2, 1909 |
| 921,357 | Brown | May 11, 1909 |
| 1,801,923 | Kella | Apr. 21, 1931 |
| 2,300,851 | Wolfard | Nov. 3, 1942 |